3,114,145
PROXIMITY WARNING DEVICE
Eugene Emile Vielle, Geneva, Switzerland, and Rudolf Arnold Wiersma, Kingston-on-Thames, England, assignors to Avel Corporation Geneva, Geneva, Switzerland
Filed June 28, 1960, Ser. No. 39,310
Claims priority, application Great Britain July 3, 1959
13 Claims. (Cl. 343—6.5)

This invention concerns improvements in transponder ranging and warning devices, more particularly for use in the avoidance of collisions between a moving vessel, such as a ship or an aircraft, and a fixed obstacle. The term "fixed obstacle" should also be understood to include any obstacle which cannot manoeuvre for any reason, e.g. a balloon; or any airspace which is, for some reason, prohibited. The prohibited or dangerous airspace may not extend to sea or ground level but such an arrangement is unusual.

The primary object of the invention is to provide apparatus designed, in the case of aircraft, to give a warning when the aircraft is in dangerous proximity to the ground, e.g. a mountain or a tall structure and this dangerous proximity is, of course, a function of both the range and the height of the aircraft and is also, to some extent, modified by the speed of the aircraft. In general the obstacle which the aircraft must avoid is a beacon or is associated with a beacon.

The object of the present invention is to provide transponder ranging apparatus for terrain clearance purposes comprising a ground-located responder and a vessel-located interrogator; in the interrogator, transmitter means for sending an interrogation signal; in the responder, receiver means for receiving the interrogation signal, coding means imparting to the interrogation signal a coding to show that the responder is ground-located and means for passing the interrogation signal after coding to a transmitter for transmitting as a response signal; and in the interrogator, receiver means to receive the response signal, means to impart to such received response signal a delay in dependence upon the direction from which it was received, means to accept or reject the response signal in dependence upon the total delay between the interrogation signal and the delayed response signal as a measure of the potential danger, together with means to determine whether the response signal is coded to show that it comes from a ground responder.

Very desirably the responder may include a delay device to impart a delay to the signal passing therethrough, such delay device controlling the range over which the interrogator will accept the response signal.

Very desirably also in the case of aircraft the signals are height coded and the arrangement may be that in the interrogator a relatively broad band of height codings is accepted. This height coding is conveniently effected by means of a pulse delay coding and, in order to achieve this range of acceptance, certain response pulses may be widened. Furthermore, the coding to show that the response comes from a ground responder may be a pulse delay code.

In order that the invention may more readily be understood, embodiments of the same will now be described with reference to the accompanying drawings, in which.

The drawings all relate to apparatus for giving proximity warning to aircraft, using height coded interrogation and response signals. In the case of ships the height coding is of course omitted, and interrogation signals may be uncoded, but it is preferable to have a fixed coding for responses from ships, to enable these responses to be more easily distinguished from beacon responses.

Figure 1:
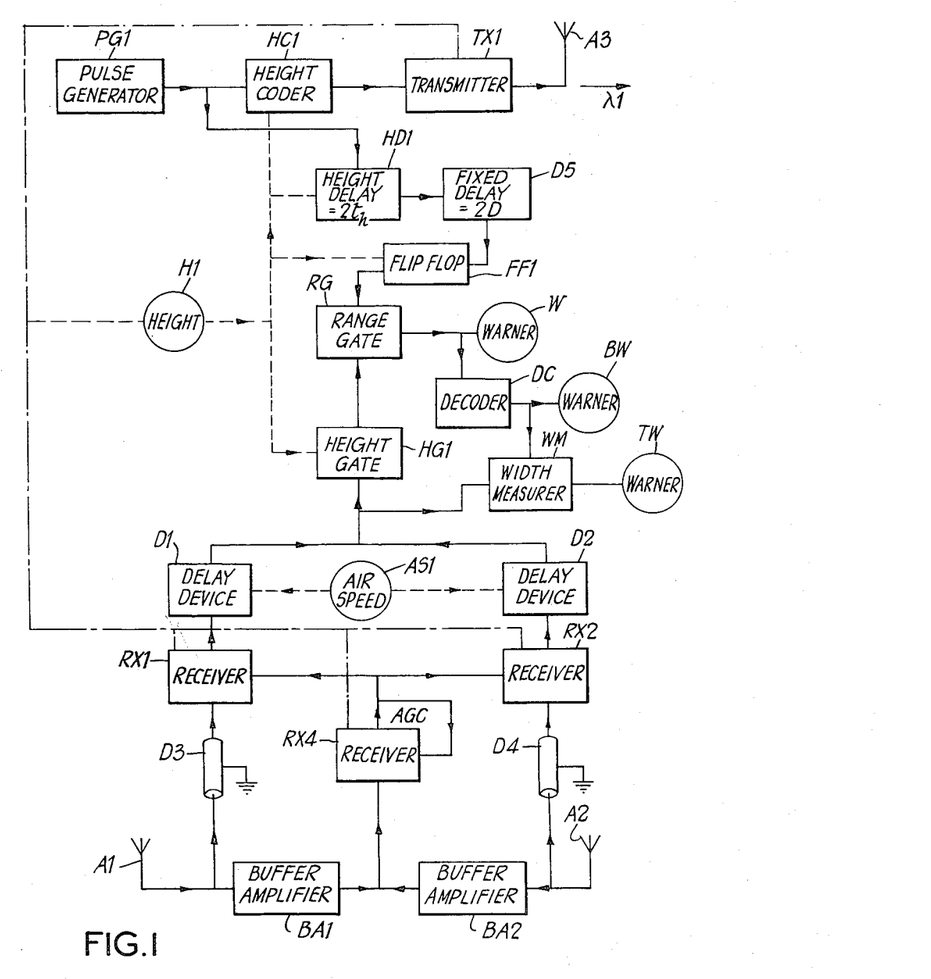
FIGURE 1 shows a modification of FIGURE 1 of the copending application Serial Number 811,127, Eugene Emile Vielle, filled May 5, 1959, now U.S. Patent No. 3,035,261, issued May 15, 1962 to provide terrain clearance facilities in accordance with the present invention.

One form of apparatus for fitting in an aircraft is shown in FIGURE 1, and includes a pulse generator PG1 which feeds signals to a height coder HC1, this height coder being controlled by a height sensitive device H1, so as to impart to the signals, as they pass through the height coder HC1, a delay which is dependent upon the height at which the aircraft is flying, the output from the height coder HC1 being a pair of pulses. This pair of pulses is fed to a transmitter TX1 to modulate the same, the signals then being fed to an omni-directional transmitting antenna A3 to be radiated at a frequency $\lambda 1$.

Figure 2:
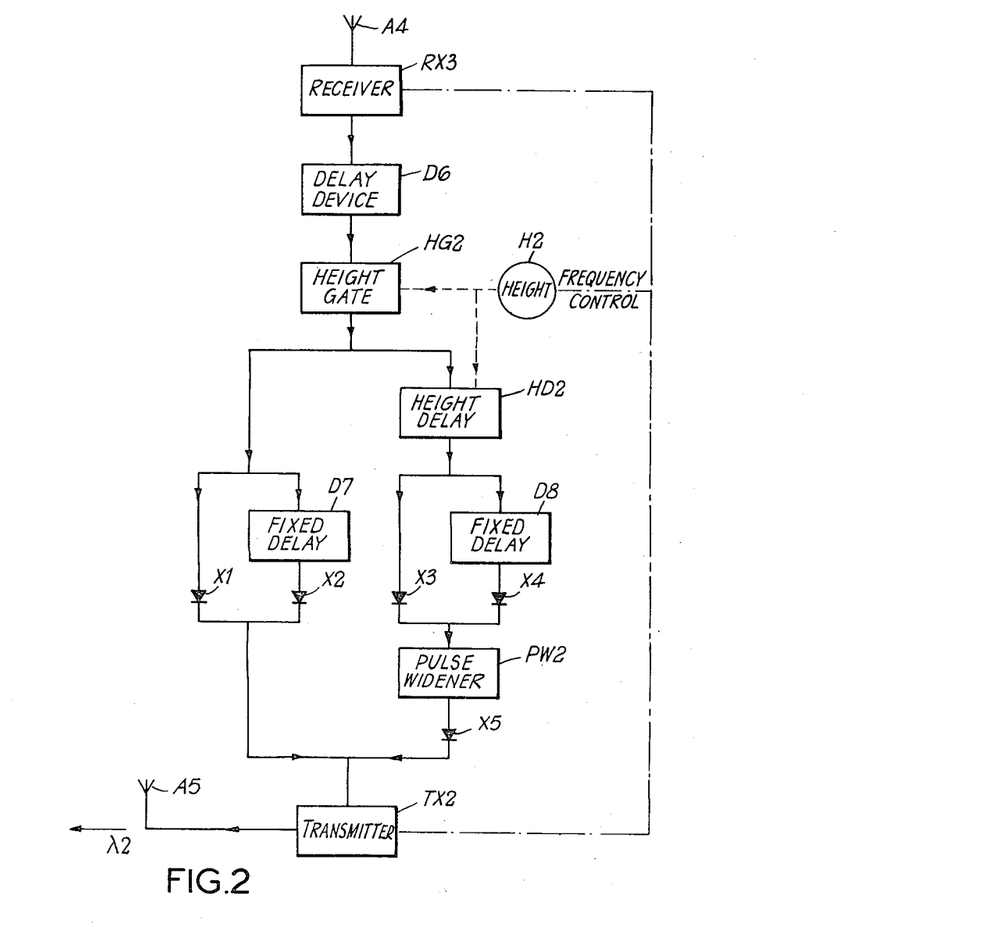
FIGURE 2 shows apparatus for a ground beacon.

The ground or beacon apparatus is illustrated in FIGURE 2 and includes an omni-directional receiving antenna A4 and a receiver RX3 operating upon the frequency $\lambda 1$. The signals from the receiver RX3 are fed to a delay device D6 and thence to a height gate HG2.

Figures 3, 4:
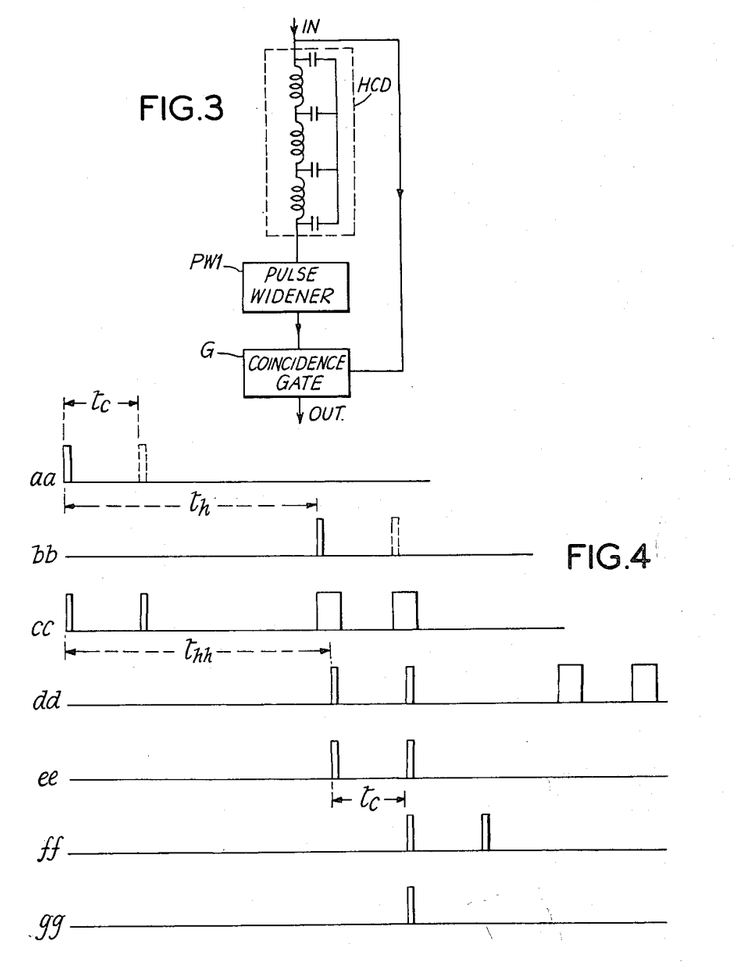
FIGURE 3 shows a height gate.
FIGURE 4 shows diagrammatically a pulse sequence.

The height gate HG2 is illustrated in FIGURE 3 and includes a height controlled delay HCD which is controlled by the height sensitive device H2 so as to delay the signals to the height gate by a time dependent on height and the delayed signals are then passed to a pulse widener PW1 and thence to one input of a coincidence gate G, undelayed signals also being passed directly to the other input of the coincidence gate G, in this way ensuring that the height gate HG2 accepts a range of height codings.

The height sensitive devices H1 and H2 are desirably pressure sensitive capsules operating in response to the ambient atmospheric pressure, as this arrangement has certain advantages, and the output from the height sensitive device H2 is capable of being offset in the case where it is not at the top of the obstacle or where it is required that a clear space be left above the apparatus of FIGURE 2.

The signals leaving the height gate HG2 of FIGURE 2 are diverted to two parallel main paths and on passing through one of these main paths are subjected to a height-controlled delay and a pulse-widening operation. Moreover each main path comprises two subsidiary paths and in one subsidiary path of each main path the pulses are subjected to a "beacon-coding" delay. The four paths are then combined.

Thus, in more detail, a pulse passes directly through a diode X1 and is also passed through a fixed delay D7 and a second diode X2, forming together one main path. The signals from the height gate HG2 are also passed through the second main path formed by a height delay HD2 which is set by the height sensitive device H2 so as to be delayed by an amount characteristic of the height of the beacon and are then split into two paths, passing through a diode X3, or through a fixed delay D8 and a diode X4, before being combined at the input to a pulse widener PW2 from the output of which they are passed via a diode X5 of the input of a transmitter TX2 together with the signals from the diodes X1 and X2. Thus four pulses are passed to the input of the transmitter TX2, namely an undelayed pulse via the diode X1; a pulse delayed by the delay D7 via the diode X2; a pulse delayed by the delay HD2 and widened by the widener PW2 via the diodes X3 and X5; and a pulse delayed by the delays HD2 and D8 and widened by the widener PW2 via the diodes X4 and X5. The height delay HD2 imparts a delay $t_h$, this being characteristic of the height of the beacon, and each of the fixed delays D7 and D8 imparts a delay $t_c$ which is characteristic of all beacons using this system and it should be understood that the delay $t_c$ lies outside the range of values allotted to the delay $t_h$. The pulses fed to the transmitter TX2 modulate the same and are transmitted from an omnidirectional antenna A5 on a frequency $\lambda 2$.

The pulse sequence of FIGURE 2 is illustrated in FIGURE 4 and line $aa$ shows a pulse arriving at the output from the height gate HG2 and in dotted lines a pulse arriving at the output from the delay D7 and delayed by an amount $t_c$. Line $bb$ of FIGURE 4 shows the pulse which arrives at the output of the height delay HD2 after being delayed by an amount $t_h$ and also in dotted lines the pulse at the output of the fixed delay D8. Line $cc$ shows the pulses at the input to the transmitter TX2 where the pulses which have passed through the height delay HD2 have been widened by the widener PW2. The pulses on the line $cc$ are the pulses which are radiated by the transmitter TX2.

In the aircraft which has the apparatus shown in FIGURE 1, the signals transmitted on the frequency $\lambda 2$ are received by directional antennae A1 and A2 and are then fed via buffer amplifiers BA1 and BA2 to a gain setting receiver RX4 which controls the gain of receivers RX1 and RX2. The signals from the antennae A1 and A2 are fed to the respective receivers RX1 and RX2 through short fixed delay lines D3 and D4 each of which delays the signals by a time D sufficient to allow the gain control voltage to build up. The arrangement is such that in general either the receiver RX1 or the receiver RX2 will give an output but not both receivers so that the signals may be delayed by an amount depending on the direction of reception, as more fully explained with reference to FIGURE 6. Thus the signals from the receivers RX1 and RX2 are fed to separate delay devices D1 and D2 controlled by an airspeed sensitive device AS1 and these signals are then combined at the input to a height gate HG1 which is controlled by the height sensitive device H1.

The height gate HG1 is generally similar to height gate HG2 shown in FIGURE 3, and includes a height controlled delay giving a delay $t_{hh}$ characteristic of the height of the aircraft, and a coincidence gate, but does not include a pulse widener. The delayed pulses are shown at line $dd$ of FIGURE 4, and thus if the delay $t_{hh}$ is approximately equal to the delay $t_h$, coincidence between the first and second delayed pulses of line $dd$ and the third and fourth undelayed pulse of line $cc$ will produce output pulses from height gate HG1 as shown on line $ee$ of FIGURE 4. It will be understood that as the third and fourth pulses on the line $cc$ are broadened pulses, coincidence will occur for a range of values of $t_{hh}$.

Thus if the beacon is offset to give warning of a high obstacle such as might be the case where the equipment is at the foot of a radio mast or is near the top of a steep mountain, the beacon will receive coded interrogations from aircraft flying well below the safe height due to pulse widening in the beacon's height gate and by responding with widened pulses it will be ensured that low flying aircraft will obtain a signal at the output from the height gate RG. Nevertheless responses from another aircraft, as disclosed in the parent application, are narrow pulses so that the height selectivity is maintained.

The broad pulse produced by widener PW2 must cover the whole range of prohibited heights and therefore the delay imparted by the device HD2 may conveniently be that to correspond to the bottom of the prohibited height band which may be sea level, whilst the extent of the widening by widener PW2 will cover the prohibited band. This assumes that the delay increases with height but obviously the converse arrangements can be used.

The pulses from the height gate HG1 are passed to a range gate RG, the range gate being operated by pulses derived from the pulse generator PG1 and delayed by a height delay HD1 giving a delay of $2t_{hh}$ (which is approximately equal to $t_h + t_{hh}$) a fixed delay D5 giving a delay of 2D and a flip-flop device FF1, so that the gate RG is opened to receive a response from minimum range and then closed at maximum range. The signals from the range gate RG are passed to a decoder DC similar to HG1, but incorporating a fixed delay $t_c$ so that the signals delayed in the decoder are those appearing on line $ff$ of FIGURE 4, and if coincidence occurs between delayed and undelayed signals, a further signal is emitted from the decoder DC, as at line $gg$ of FIGURE 4, to activate a beacon warning device BW to advise the pilot that he is within a short flying time of a beacon and too low to fly over the obstacle. Obviously the pilot, on having his beacon warning device BW activated, may either climb or may turn away from the beacon.

The aircraft may carry a device WM to measure the maximum width of received pulses. The width measurer WM is shown as connected to the input of the height gate HG1 and the output of the decoder DC, so that if a beacon signal is received to activate the warning device BW and the device WM shows that the minimum safe height as given by the maximum width of received pulses is above that set by the pilot as his maximum height, a "turn" warning device TW is activated.

The range of warning will quite clearly depend upon the fixed delay D6 of FIGURE 2 and the shorter the delay that this device imparts, the greater will be the warning range. The delay may be varied according to weather conditions, for example, or may be pre-set to take into account the area which must be kept free. The warning range will also depend upon the speed of the aircraft, which alters the delay devices D1 and D2 in FIGURE 1 and it will be understood that these delays may depend on actual speed or may be pre-set in accordance with the cruising or maximum speed of the aircraft. Furthermore, the range at which warning is given will depend upon whether the aircraft is approaching or receding from the beacon, i.e. whether the signal is received more strongly by the antenna A1 or A2. The minimum delay imparted by the delay D6 is D.

It may be convenient to provide that the interrogations on the frequency $\lambda 1$ have height coded delays in which the delay increases with increasing height, whilst the response on the frequency $\lambda 2$ have the same range of delays but where the delay decreases with increasing height. It will be understood that in this arrangement the total delay introduced due to coding and decoding the height is constant if the heights are the same and so the height delay HD1 of FIGURE 1 may be a fixed delay and may well be combined with the delay D5.

In a further possible arrangement, the pulse wideners are incorporated in the delay device by making use of a multi-tapped delay line to act as the delay device and to arrange that all tappings below the selected tapping are connected in parallel through diodes so that a plurality of outputs to the delay device are commoned to give the pulse widening feature.

Furthermore, instead of the pure pulse delay code system which has been described in detail, the present invention may be applied to a frequency code system either in place of the delay code system or additionally thereto. It does not appear necessary to describe the frequency code system in detail, but the arrangement may be based upon varying the frequency of the transmitter TX1 in accordance with height. To this end therefore the transmitter TX1 of FIGURE 1 will be connected to the height sensitive device H1 as indicated by chain dotted lines. Similarly, the receivers RX1, RX2 and RX4 will also be connected to the height sensitive device so that their tuning is controlled. It will be possible to omit the various height gates and height controlled delays such as HG1 and HD1 from FIGURE 1. In FIGURE 2, the height sensitive device H2 will control the receiver RX3 and the transmitter TX2 and, provided that narrow tuning is used, the height gate HG2, height delay HD2, delay D3 and widener PW2 will be omitted.

In certain circumstances it may be desirable that the beacon warning range should be different in various directions, for example in the case of a control zone area or a mountain where the mountain has different slopes on the two sides. This may be achieved by using the multiple antenna and receiver arrangement of FIGURE 1 to replace the single antenna A4 and its associated receiver of FIGURE 2.

The beacon arrangement shown in FIGURE 2 makes no allowance for the fact that an intruding aircraft may be very near the top or bottom of the prohibited height zone and if it is required to give, for example, a longer warning to an aircraft which is intruding near the bottom of the height zone, this may be achieved by providing, in parallel to the delay device D6 and height gate HG2 of FIGURE 2, a further delay device and height gate giving, for example, a shorter delay (i.e. longer warning) and accepting only height codings near the bottom of the prohibited height band. Clearly any number of height bands may be differentiated in this way. Another means of achieving this result is described later with reference to FIGURE 8.

The embodiment to be described with reference to FIGURES 5 to 9 is modified slightly as compared with the embodiment of the previous figures in order to obviate the need for pulse widening in the responder and also to simplify the responder so that in place of the four pulse sequence transmitted in that arrangement only a three pulse sequence is necessary to convey the same information.

In the embodiment of FIGURES 5 to 9, although certain of the parts are the same as the parts of FIGURES 1 to 4, they are in general connected differently and perform slightly different functions, and therefore different reference numerals are applied to the parts.

Figure 5:
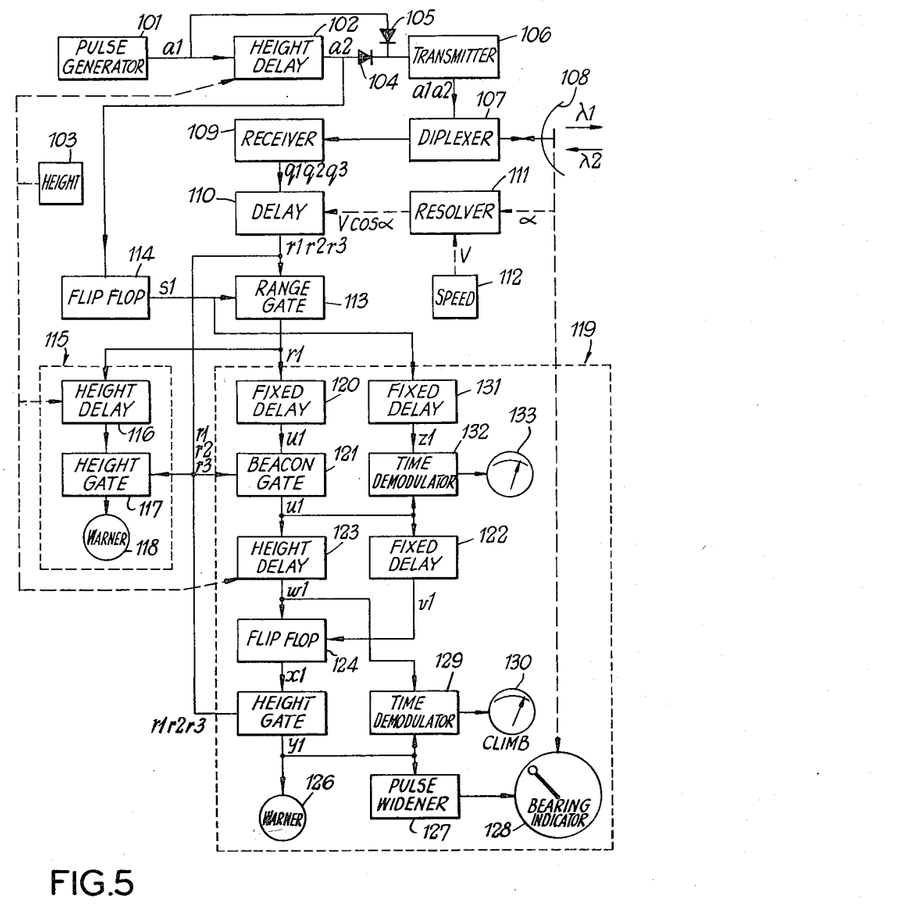
FIGURE 5 shows a modified form of apparatus for fitting in an aircraft.
Figure 7:
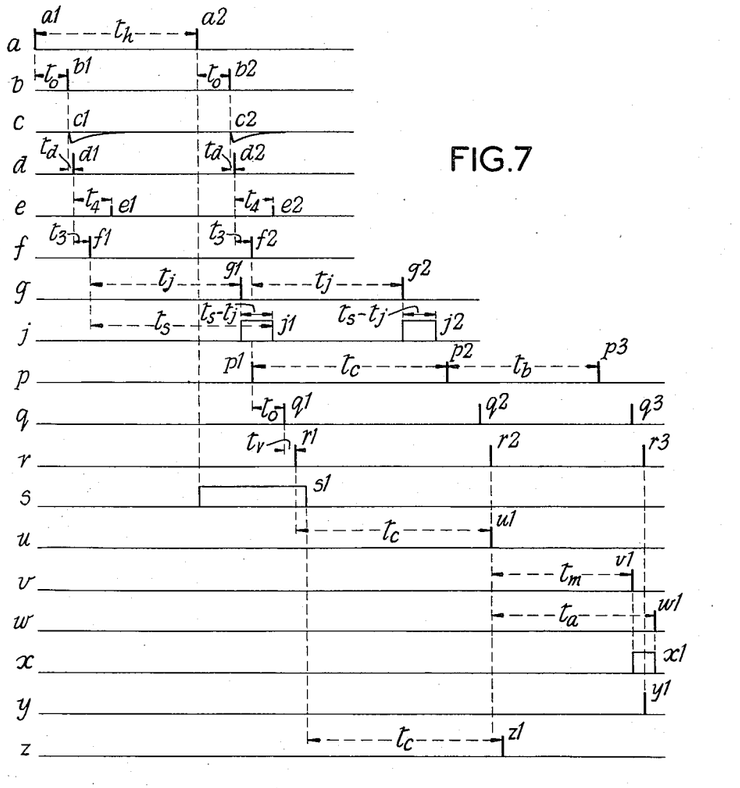
FIGURE 7 shows a pulse diagram relating to the embodiment of FIGURES 5 and 6.

Referring now to FIGURE 5 which shows the apparatus for an aircraft, a pulse generator 101 generates a train of pulses one of which is shown at $a1$ on line $a$ of FIGURE 7 and additionally the point at which the pulse $a1$ appears is indicated in FIGURE 5. These pulses are fed to a height delay 102 which is controlled by a pressure sensitive device 103 that is responsive to ambient atmospheric pressure so that each pulse fed to the height delay 102 is delayed by a time $t_h$ which is characteristic of the height of the aircraft and such a delayed pulse is shown at $a2$ in FIGURE 7. It should be pointed out that the system of coding is such that the delay $t_h$ and all the other height dependent delays decrease with increasing height but it will be apparent that the reverse system may be used. The delayed pulse from the height delay 102 and the undelayed pulses from the pulse generator 101 are combined into a single channel and recirculation of the pulses is prevented by suitable means such as rectifiers 104 and 105 which may, for example, be semi-conductor diodes. Both the pulses $a1$ and $a2$ are then used to key a transmitter 106 which generates a radio frequency carrier wave of a frequency $\lambda 1$. The output from the transmitter 106 is fed via a transmit-receive switch or diplexer 107 to a directional antenna system 108 which is arranged to rotate about a vertical axis and which has a narrow beam in azimuth. It will be apparent that this height coded interrogation signal is received by aircraft or beacons which are suitably equipped and which are within range of the transmitter 107 as the beam from the antenna 108 sweeps over them.

Figure 6:
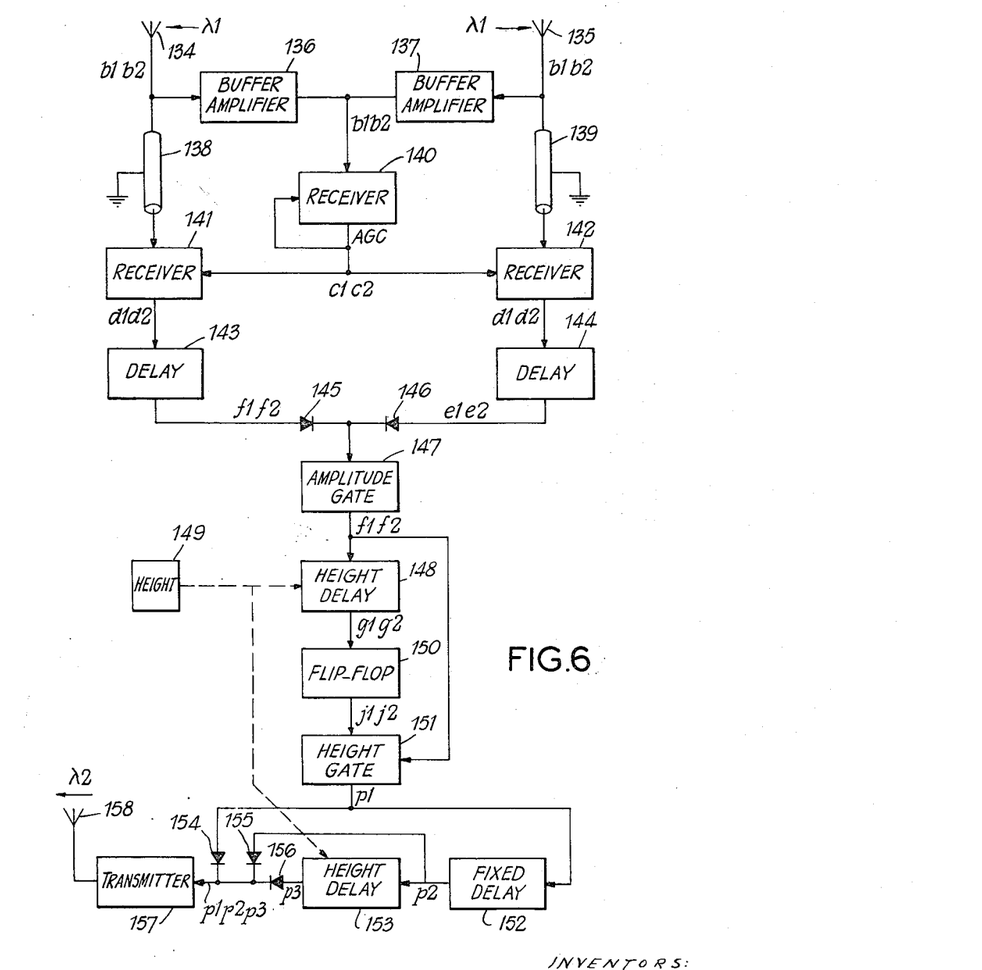
FIGURE 6 shows the co-operating apparatus for a beacon.

The interrogation signals from the interrogator transmitter 106 of FIGURE 5 at a frequency $\lambda 1$ are received by the responder of the beacon and this responder is shown in FIGURE 6. Obviously a finite time will be taken for the transmission between the aircraft and the beacon and this time $t_0$ means that the pulses received by the responder and shown as $b1$ and $b2$ will be delayed as compared with the pulses $a1$ and $a2$.

The beacon has two receiving antennae 134, 135 which are directional so as to cover between them all directions in azimuth with some overlap between the polar diagrams, so that in general any signal will be received more strongly by one antenna than by the other.

The antenna 134 feeds a buffer amplifier 136 whilst the antenna 135 feeds a buffer amplifier 137 and the outputs of these two buffer amplifiers are combined and fed to the input of a gain setting receiver 140. Consequently the input signal to the receiver 140 has a strength which will be the sum of the two inputs and this will correspond approximately to the strength of the stronger signal except for signals originating at about the overlap points. The receiver 140 amplifies and detects its input signals and for each input pulse produces a negative-going voltage pulse having a very rapid rise time and a relatively rapid decay time as shown at $c1$ and $c2$ in FIGURE 7 and these pulses are fed back to the amplifier stages of the receiver 140 to provide automatic gain control and to prevent over-loading the receiver 140.

The antennae 134, 135 also feed delay lines 138, 139 and separate receivers 141, 142 and these receivers 141, 142 are also fed by the pulses $c1$, $c2$ to serve as automatic gain control. It will be apparent that the purpose of the buffer amplifiers 136, 137 is to isolate the two antennae and that the purpose of the delay lines 138, 139, each of which produces a delay $t_d$, is to allow for the rise time of the automatic gain control signal. Consequently for each input pulse $b1$ both of the receivers 141 and 142 will emit an output pulse $d1$ delayed by a time $t_d$ but one of these two pulses will be much weaker than the other due to the gains of both receivers being reduced by the pulse $c1$ to a level only just sufficient for the stronger signal to produce an output of normal amplitude. It is possible that the pulse $d1$ from one of the two receivers 141, 142 will not be entirely suppressed but it will be of much smaller amplitude than the pulse from the other receiver and will be suppressed at a later stage in the apparatus, as will be clear.

The output pulse $d1$ from the receiver 141 is fed to a delay 143 to produce an output pulse $f1$ delayed by a time $t_3$, whilst the output pulse $d1$ from the receiver 142 is passed to a delay 144 to emerge as an output pulse $e1$ delayed by a time $t_4$. Consequently the pulses $f1$ and $e1$ will not be coincident and the times that they have been delayed will be significant of the direction from which they are received. These two pulses $f1$ and $e1$ are passed through isolating diodes 145 and 146 respectively to the input of an amplitude gate 147 which will reject the weak pulse, if it is present, and for the sake of example it will now be assumed that the pulse $e1$ is rejected but that the pulse $f1$ passes through.

Thus it is now assumed that the antenna 134 receives the stronger signal and the pulses $b1$, $b2$ from this antenna appear at the output of the amplitude gate 147 as pulses $f1$, $f2$ delayed by a time $t_d + t_3$ as compared with the pulses $b1$, $b2$ and as seen at line $f$ in FIGURE 7. Consequently it will be apparent that the warning range differs on the two sides of the beacon in the arrangement shown and it will be equally clear that this is an optional device and that only a single antenna and receiver system may be provided or alternatively more than two such antennae may be provided, if it is desired to give a more complex shape to the warning area.

The pulses $f1$, $f2$ from the amplitude gate 147 are fed to the input of a height delay 148 controlled by a height sensitive device 149 so as to impart a delay $t_j$ which is characteristic of the ambient pressure on the same scale of delays as is produced by the height delay 102 of FIGURE 5. It will be apparent that the height of the beacon does not, in point of fact, change but it is desirable that the delays should change to correspond to changes in ambient atmospheric pressure due to weather conditions. The height delay 148 emits output pulses $g1$, $g2$ which are used to trigger a monostable flip-flop device 150 and this flip-flop produces output pulses $j1$ and $j2$ whose leading edge coincides in time with the pulses $g1$ and $g2$ and whose length is equal to $t_s - t_j$, where $t_s$ is the delay corresponding to sea level. It will be apparent that the lengths of these pulses are always the same as $t_s$ and $t_j$ change together.

Bearing in mind the fact that for height coding the delay increases with decreasing height, it will be seen that the pulse $j1$ starts at a time after the pulse $f1$ representing the height of the beacon and ends at a time after the pulse $f1$ representing sea level. The pulses $j1$ and $j2$ are passed to a height gate 151 which is constituted by a coincidence gate, this device sometimes also being known as an "and" gate. The other input to this height gate 151 is the pulses $f1$, $f2$ taken from the output of the amplitude gate 147. Thus an output pulse $p1$ is given by the pulse $f2$ if it coincides with any part of the pulse $j1$, that is to say if and only if the height of the interrogating aircraft lies between the height of the beacon and sea level.

The height delay 148 may be offset so as to produce a delay which does not correspond to the actual height of the height sensitive device 149 but rather to some greater height at which it is desired to give warning, for it will be apparent that it will not always be convenient to locate the apparatus of FIGURE 6 at the top of the obstruction and furthermore some margin of safety should normally be allowed.

The pulse $p1$ is passed to a transmitter 157 via an isolating diode 154 and is also passed to a fixed delay 152. The output from the fixed delay 152 is a pulse $p2$ which is delayed with respect to the pulse $p1$ by a time $t_c$, the time $t_c$ being a characteristic coding time for all beacons. This pulse $p2$ is passed to the transmitter 157 via an isolating diode 155 and is also passed to a height delay 153. This height delay is controlled by the height sensitive device 149 and the output from the height delay is a pulse $p3$ which is delayed with respect to the pulse $p2$ by a time $t_b$, characteristic of the height of the obstruction. This pulse $p3$ is passed to the transmitter 157 by an isolating diode 156 and the transmitter 157 feeds an antenna 158 with the response signal constituted by the pulses $p1$, $p2$, $p3$ to radiate the same at a frequency $\lambda 2$.

It should be noted that the value of the delay $t_c$ characteristic of a beacon is outside the range of values used for the height delay $t_b$. Although the system has been described for the case where the delay $t_b$ decreases with increasing height, this is not necessary and neither is it necessary that the delays $t_h$ and $t_j$ for the interrogation coding and decoding should be upon the same scale as the delays for the response coding.

The response signals from the transmitter of the ground-located responder reach the aircraft after the time $t_0$ required for transmission and are picked-up by the antenna 108 and routed by the diplexer 107 to a receiver 109. The amplified and detected pulses $q1$, $q2$ and $q3$ shown in line $q$ of FIGURE 7 are passed to a delay 110 and this delay is controlled by a resolver 111 which has an input shaft coupled to, or driven in synchronism with, the antenna 108 so that the position of the shaft of the resolver corresponds to the angle $a$ between the heading of the aircraft and the direction in which the antenna 108 is pointing. An air speed repeater or similar device 112 provides a further input to the resolver 111 which is proportional to the air speed V of the aircraft so that the output of the resolver 111 is proportional to $V \cos \alpha$, that is to say the speed of the aircraft resolved in the direction in which the antenna is pointing or, in other words, towards the obstruction. This output from the resolver 111 controls the delay 110 so that the latter produces a delay $t_v$ which is dependent upon the resolved component of velocity, thereby to provide delayed pulses at the output of the delay 110 and which are shown as $r1$, $r2$, $r3$ in FIGURE 7. In order to provide a substantially constant warning time of one minute from the possible collision the delay imparted by the device 110 may be made equal to $(1,000 - V \cos a)/5.6$ micro-seconds, where V is expressed in miles per hour, and it will be understood that the greater the component of velocity of the aircraft towards the responding station, which may either be a fixed beacon or another aircraft, the less will be the delay so that a substantially constant warning time is given.

The response signal leaving the delay 110 is accepted or rejected in dependence upon the total delay between sending the interrogation and receiving the first pulse of the response signal and, if the first pulse is accepted, decoding follows to determine whether the response comes from an aircraft or a beacon and also whether the height coding indicates a responding station which is potentially dangerous. Since the height coded interrogation signal must be decoded in the responding station, the earliest possible time at which the first response pulse can arrive is coincidentally with the time of transmission of the pulse $a2$ and accordingly the output of the height delay 102, taken from between the height delay 102 and the rectifier 104, is passed to the input of a mono-stable flip-flop 114 which produces a pulse $s1$ as shown in FIGURE 7, the leading edge of this pulse coinciding with the pulse $a2$ and this pulse having a length which corresponds to the warning period required, that is to say approximately to the maximum range from which signals will be accepted. In the typical case being considered where a one minute warning is required, the length of the pulse may be 360 micro-seconds in order to give the required warning time for an aircraft or beacon at an effectively dangerous height.

The pulses $r1$, $r2$ and $r3$ are passed to one input of a range gate 113 in the form of a coincidence gate, the other input to this range gate being the pulse $s1$ from the flip-flop 114 and, if the first pulse $r1$ coincides with any part of the pulse $s1$, the pulse $r1$ will appear at the output of the range gate 113. The delay introduced between the pulses $r1$ and $r2$ is so long that neither of the pulses $r2$ and $r3$ could coincide with the pulse $s1$ and consequently these pulses are always rejected by the gate 113.

The pulse $r1$ from the range gate 113 and the pulses $r1$, $r2$ and $r3$ from the delay 110 are passed by separate lines to two separate portions of the apparatus, namely a portion 115 which is designed to deal with responses from other aricraft and a portion 119 which is designed to deal with responses from ground-located responders.

The portion 115 is only active when the response comes from another aircraft and therefore needs only brief description. It includes a height delay 116 to which the pulse $r1$ is passed to be delayed by a time $t_a$ to produce an output pulse which is passed to a height gate 117 the other input to this height gate being fed with the pulses $r1$, $r2$, $r3$. If the responses originate from another aircraft, the second pulse will be delayed as compared with the first pulse by a time characteristic of the height of the other aircraft and, therefore, if the two aircraft are at the same height, coincidence will occur between the pulse identified as $r2$ and the pulse from the height delay 116 whereby an output pulse will emerge from the height gate 117, this output pulse being used to activate a warner 118.

It should be noted that the beacon response pulses do not cause the operation of warning device 118, since the characteristic delay $t_c$ between the first and second beacon response pulses is greater than the maximum value of delay employed for height coding the aircraft responses, and so cannot produce a coincidence in section 115, even if the first pulse of the beacon response is passed by coincidence gate 113 to delay device 116 and thence to coincidence gate 117. Furthermore, although the separation between the second and third beacon response pulses may equal the delay produced by delay device 116, the second pulse arrives too late after the interrogation to pass through coincidence gate 113, hence there is no corresponding input signal to height delay 116 or to the first input of coincidence gate 117, hence the latter cannot produce an output pulse at the moment when the third beacon responses pulse reaches its second input.

The portion 119 includes a fixed delay 120 to which the pulse $r1$ is fed to delay this pulse by the time $t_c$, characteristic of the coding of a beacon response, thereby to produce a pulse $u1$ at the exit of the delay 120 and this pulse is passed to one input of a coincidence gate acting as a beacon gate 121. The other input to the beacon gate 121 is formed by the pulses $r1$, $r2$ and $r3$ from the delay 110. If, therefore, the pulse $r2$ is the second pulse of a beacon response it will be delayed as compared with the pulse $r1$ by a time $t_c$ and will, therefore, coincide with the pulse $u1$ so that the pulse $u1$ emerges from the beacon gate 121. The output from this beacon gate 121 is fed to a fixed delay 122 which produces an output pulse $v1$ delayed with respect to the pulse $u1$ by a time $t_m$ which is equal to the minimum value of delay used for height coding beacon responses and, therefore in this case, corresponding to the maximum height for which the apparatus is designed. Consequently this pulse $v1$ occurs at the earliest possible time at which the pulse $r3$ could occur if this pulse $r3$ is the third pulse of a beacon response. The output of the beacon gate 121 is also fed to the input of a height delay 123 which is controlled by the pressure sensitive device 103 to produce a delay $t_a$ characteristic of the height of the aircraft on the same scale as the delay $t_b$ produced by the delay device 153 of FIGURE 6. The pulse $u1$ entering the height delay 123 therefore emerges as a delayed pulse $w1$.

The pulse $v1$ forming the output of the fixed delay 122 is fed to the input of a bi-stable flip-flop 124 so that this pulse $v1$ triggers the flip-flop 124 from a first state to a second state. The pulse $w1$ forming the output of the height delay 123 is fed to the other input of the flip-flop 124 so as to trigger the flip-flop from the second state back to the first state and consequently the output of this flip-flop is a long pulse $x1$ whose leading edge represents the maximum possible height and whose trailing edge represents the actual height of the aircraft, bearing in mind the fact that the delay due to height increases with decreasing height. The pulse $x1$ from the flip-flop 124 is passed to one input of a height gate 125, the other input to this height gate being the output of the delay 110 that is to say, pulses $r1$, $r2$ and $r3$. An output pulse $y1$ emerges from the height gate 125 if, and only if, the pulse $r3$ is delayed with respect to pulse $r2$ by a time representative of a beacon which is coded to appear to be higher than the aircraft and thus constituting a possible danger. A number of such pulses $y$ occurring in quick succession are arranged to activate a warner 126 to inform the pilot.

It should be noted that the reception of a response from an aircraft consisting of two pulses with the same spacing as beacon response pulses $r2$, $r3$ will not produce an output pulse $y1$, since the latter depends on the emergence of pulse $u1$ from beacon gate 121, which in turn depends on the reception of two pulses at the spacing $t_c$ used only by beacons. Thus there is no interference from aircraft responses, even if these are received simultaneously with beacon responses.

The remaining portion of the apparatus of section 119 of FIGURE 5 represents optional extras designed to give further information to the pilot to assist him in avoiding the obstacle to which his attention has been drawn by the activation of the warner 126.

Thus, in order to provide an indication of the relative bearing of the beacon, the output from the height gate 125 and constituting a pulse $y1$ is passed to a pulse widener 127 which acts to produce a broad pulse on being triggered by the $y1$ pulse and this pulse widener 127 may, if required, include an amplifier and a relay, the purpose of the latter being apparent hereinafter. The output of the pulse widener 127 is fed to a bearing indicator 128 which is typically in the form of means to produce an illuminated area at an angular position which will indicate the bearing of the beacon relative to the heading of the aircraft and in one form may comprise a rotating arm or disc driven in synchronism with the antenna 108. The outer part of such arm or disc carries an incandescent or discharge lamp which is illuminated by the pulses from the pulse widener 127 so that each time the beam from the antenna 108 scans a beacon (provided that this beacon is a potential danger) the lamp of the bearing indicator 128 will be illuminated at an angular position corresponding to the relative bearing. An alternative form of bearing indicator 128 comprises a cathode ray tube preferably of the long persistence type on which a circular trace is produced by a spot rotating in synchronism with the antenna 108 and this spot is suitably brightened or radially deflected by the signals from the pulse widener 127.

In order to give an indication to the pilot of how far he has to climb in order to pass over the obstruction indicated by the beacon, a time demodulator 129 and meter 130 are provided. The time demodulator 129 is of the type working by direct time comparison without feedback so that a substantially correct output is obtained from one or more reference pulses each followed by a time modulated pulse. The reference pulse fed to the time demodulator 129 is the pulse $y1$ from the coincidence gate 125 and the time modulated pulse is the pulse $w1$ from the output of the height delay 123, these two pulses being fed to separate inputs of the time demodulator 129.

It will be remembered that the pulse $y1$ is derived from the pulse $r3$ by the height gate 125 and occurs at a time $t_b$ after the pulse $u1$, where $t_b$ represents the height of the beacon, whilst the pulse $w1$ occurs at a time $t_a$ after the pulse $u1$, where $t_a$ represents the height of the aircraft. Thus if the aircraft is lower than the beacon the pulse $w1$ will occur after the pulse $y1$ and the time between these two pulses will represent the height difference between the aircraft and the beacon or, in other words, the height that the aircraft is to climb to avoid the obstruction indicated by the beacon. The time between these pulses $y1$ and $w1$ is converted by the time demodulator 129 into a voltage or current proportional to time and is then fed to a meter 130 to deflect the same, this meter conveniently being calibrated to indicate directly the height to be climbed. If the aircraft is above the beacon no $y1$ pulses will emerge from the height gate 125 and thus zero indication is given by the meter 130.

It will be remembered that the warning device 126 gives a warning as soon as the aircraft is within a zone of danger around the beacon, this zone not being of fixed dimensions but being equivalent to approximately one minute flying time. If the speed and direction of the aircraft continue to be such that the aircraft remains within the zone the warning continues to be given, but if the aircraft should turn away from the beacon the warning would cease at a comparatively short range. Consequently therefore, if it is desired to give an indication to the pilot of how far he is inside the dangerous zone, a fixed delay 131, time demodulator 132 and meter 133 may be used.

The pulse $r1$ must occur during the pulse $s1$ if the beacon is to be considered a potential danger, as will be understood, and furthermore the leading edge of the pulse $s1$ represents zero range whilst the trailing edge of this pulse represents the maximum range which is considered dangerous. Thus it will be apparent that the greater the separation between the pulse $r1$ and the trailing edge of the pulse $s1$ the greater is the danger, as the shorter is the flying time within which action can be taken. However, it is not possible to operate directly upon the pulse $r1$, as until the pulse $r2$ is received there is no certainty that the signals originate from a beacon; if the signals do in fact originate from a beacon, the pulse $u1$ will be emitted from the beacon gate 121. Accordingly this pulse $u1$ from the beacon gate 121 is fed as a reference pulse to the first input of the time demodulator 132 which is similar in construction to the time demodulator 129. However, the time modulated pulse, that is to say the pulse $s1$, must be delayed by the time between the pulse $r1$ and the pulse $u1$, that is to say by the amount $t_c$, and to this end therefore the pulse $s1$ from the flip-flop 114 is passed through a fixed delay 131 to provide an output pulse $z1$, the leading edge of the pulse $s1$ being disregarded, when the time relationship between the pulses $u1$ and $z1$ will be the same as the time relationship between the pulse $r1$ and the trailing edge of the pulse $s1$. Consequently if the pulse $z1$ is fed to the second input of the time demodulator 132, the voltage or current output therefrom may be fed to the meter 133 and the greater the deflection of this meter the shorter will be the time for taking action. It will be apparent that since this arrangement is based upon the $u1$ pulse, every beacon within dangerous range will give an indication on the meter 133 even if the $y1$ pulse does not emerge as the aircraft is flying at a safe height. If this is considered to be a disadvantage, the $y1$ pulse can be arranged to control the activation of the meter 133 and very conveniently the relay associated with the pulse widener 127 may be used to connect the meter 133 to the output of the time demodulator 132 when the $y1$ pulse appears.

In the responder apparatus, additionally to the duplicated receiving chain, it is possible to provide a duplicated transmitter chain and it will be apparent that any combination of single or duplicated chains may be provided. Thus in place of the single transmitter 157 and omni-directional antenna 158, two transmitters 157 are provided each feeding separate directional antennae 158. In order to feed these transmitters, it will be desirable to duplicate the chain leading thereto and thus separate amplitude gates 147, height delays 148, flip-flop devices 150, height gates 151, fixed delays 152 and height delays 153 will be necessary to feed the two transmitters.

It will be apparent that if duplicated transmitting chains are fed by duplicated receiving chains, the respective amplitude gates 147 will be fed directly from the delays 143, 144. On the other hand, if a single receiving chain is used, the delays 143, 144 can be incorporated in the transmitting chain. Clearly more than two chains can be provided if desired.

Figure 8:
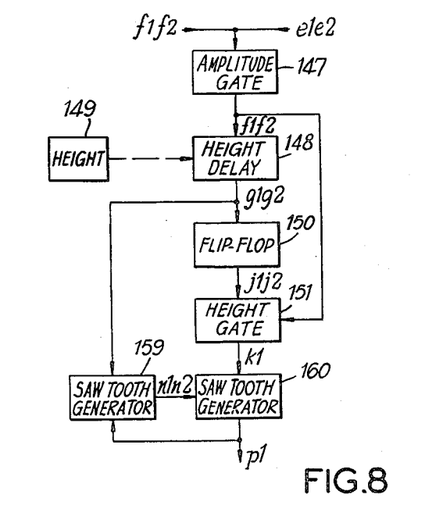
FIGURE 8 is a modification of a portion of FIGURE 6.
Figure 9:
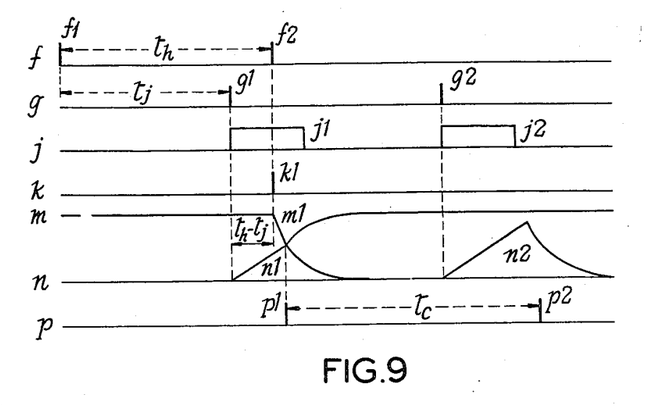
FIGURE 9 is a pulse diagram corresponding to FIGURE 8.

FIGURE 8 shows a modification of FIGURE 6 and FIGURE 9 is the pulse diagram associated therewith. The modified apparatus of FIGURE 8 differs from that of FIGURE 6 in that the delay imparted to the response depends not only on the direction from which the interrogation was received, but also on the height of the interrogating aircraft so that it is possible to give a longer warning to an aircraft which is flying well below the safe height.

In the arrangement of FIGURE 8, the pulses $f1$, $f2$ emitted from the amplitude gate 147 pass as before to the height delay 148 and emerge therefrom as pulses $g1$ and $g2$ and these pulses are passed to the flip-flop 150 to emerge as widened pulses $j1$ and $j2$, being fed from thence to the height gate 151. Pulses $f1$ and $f2$ are fed to another input of height gate 151, where coincidence between $j1$ and $f2$ causes the latter to emerge as a pulse $k1$. This pulse $k1$ initiates the pulse $p1$ forming the first pulse of the response after an interval which depends upon the height coding of the interrogation, that is to say the interval between the pulses $b1$ and $b2$ which is the same as the interval between the pulses $g1$ and $g2$. Thus the pulses $g1$ and $g2$ are fed from the height delay 148 to a saw tooth generator 159 which may, for example, include a triggerable negative-going saw tooth generator whose output is amplified and inverted to produce a positive-going saw tooth at a low impedance. Thus each pulse $g1$, $g2$ initiates a positive-going saw tooth $n1$, $n2$ as shown at line $n$ in FIGURE 9 and these pulses are passed to a second saw tooth generator 160 which is triggered by the pulse $k1$ to produce a negative-going saw tooth shown as $m1$ in FIGURE 9. The saw tooth pulse $n1$ starts at a time after the pulse $f1$ represented by the height of the beacon, namely $t_j$, whilst the saw tooth pulse $m1$ starts at a time coincident with the pulse $f2$ which follows the pulse $f1$ after a time $t_h$ representing the height of the aircraft, and therefore the start of the saw tooth $m1$ occurs at a time $(t_h - t_j)$ after the start of the saw tooth $n1$, this time representing the height that the aircraft is below the beacon. The saw tooth generator 160 includes means to emit a pulse $p1$ when the potentials of the saw tooth pulses $m1$ and $n1$ are equal, this quality occurring at a time representative of the spacing of the aircraft below the beacon. When the pulse $p1$ is emitted, the saw tooth generator 160 returns to its initial quiescent state and this pulse $p1$ is used in the same fashion as in FIGURE 6 to generate the pulses $p2$ and $p3$ keying the transmitter 157. The pulse $p1$ is also sent back to a second input of the saw tooth generator 159 to terminate the saw tooth $n1$ when the saw tooth generator will return to its initial quiescent state and will be retriggered by the pulse $g2$ to produce a saw tooth $m2$. However, on this occasion no resetting pulse emerges but when the saw tooth $m2$ reaches its limit the generator 159 is arranged to return to the quiescent state without resetting.

It will be understood that many of the delay devices must be of a type capable of handling narrow or wide pulses and also on occasions more than one pulse at the same time, and for this reason the delay devices are desirably delay lines or magnetic drum delays and it is preferred not to use electronic delays such as phantastrons. In the case of fixed delays, acoustic devices such as quartz blocks may be used. Moreover, the delay devices may, if necessary, incorporate the pulse wideners and may, for example, be delay lines with poor frequency response.

Thus it will be understood that the present invention provides apparatus which is modified as compared with the apparatus of the parent invention and is designed to provide, an addition to the aircraft-to-aircraft facilities of the parent application, aircraft-to-ground facilities where the ground station may be either a beacon or other responder.

We claim:

1. Transponder ranging apparatus for terrain clearance comprising; a ground located responder and a vessel-located interrogator, wherein is provided; in the interrogator, a transmitter to send an interrogation signal; in the responder, a receiver to receive the interrogation signal, a coder, means passing the received interrogation signals from said receiver to said coder to impart to such signal a coding to show that the responder is ground located, a transmitter, and means to pass the interrogation signals from said coder to said transmitter whereby said signal after coding is transmitted as a response signal; and in the interrogator, a receiver to receive such response signal, means to impart to such received response signal a delay in dependence upon the direction from which it was received, means active to accept the response signal in dependence upon the total delay between the interrogation signal and the response signal after it has been delayed, and means to detect coding imparted to such response signal by said coder aforesaid.

2. The apparatus of claim 1 including in said responder a delay device to delay signals passing therethrough, thereby to vary the range over which the interrogator will accept response signals by virtue of the consequent change in the said total delay.

3. Transponder ranging apparatus for terrain clearance purposes comprising a ground-located responder including a receiver and a transmitter and an aircraft-located interrogator including a transmitter and a receiver, the transmitter in the interrogator emitting interrogation signals; means in said interrogator to code the interrogation signals in accordance with the height of the aircraft; in the responder, acceptor means to accept an interrogation signal in dependence upon the height coding thereof, a coder to code the output signal from said acceptor means to show that the responder is ground located, thereby to form a response signal, means to pass a signal from said acceptor means to said coder and means to pass such response signal to the transmitter; and in the interrogator, means to impart to the response signal from the receiver a delay in dependence upon the direction from which it was received, means to accept the response signal in dependence upon the total delay between the interrogation signal and the response signal after delay, and means to detect said coding of the response signal to show that it comes from a ground-located responder.

4. Transponder ranging apparatus for terrain clearance purposes comprising an interrogator located in an aircraft; in such interrogator, a pulse source, height sensitive means and effective to double pulses passing therethrough, a coder controlled by such height sensitive means, means passing pulses from said pulse source to said coder whereby such pulses are doubled at a spacing indicative of height, a transmitter, and means passing pulses from said coder to said transmitter to form interrogation signals; a ground-located responder, such responder including a receiver to receive such interrogation signals, pressure sensitive means, means passing the two pulses of an interrogation signal to a height gate controlled by said pressure sensitive means thereby to provide a single pulse if the height coding is in a preselected range, a fixed coder to code signals to show that the responder is ground located, means passing signals from said height gate to said fixed coder, a transmitter, means passing signals from said fixed coder to said transmitter, a delay device controlled by said pressure sensitive means, a pulse widener, means passing signals from said height gate to said delay device and thence to said pulse widener, thereby to generate a delayed widened pulse, means passing signals from said pulse widener to said transmitter whereby a pair of pulses are transmitted as a response signal, the second such pulse in each pair being widened to cover a range of heights; and, in the interrogator, delay means set by the said height sensitive means and coincidence means fed by the output of said delay means, such delay means and coincidence means being fed by the response signal from the receiver whereby a single pulse is emitted if the height coding of the response signal is the same as the height coding of the aircraft carrying the interrogator, a gate closed a pre-determined time after the interrogation signal has been transmitted thereby to control the range over which responses will be accepted, means passing the output from said coincidence means to said gate, a decoder to detect the coding imparted by said fixed coder, means passing the output from said range gate to said decoder, a warning device, and means passing the output from said decoder to said warning device.

5. The apparatus of claim 4 wherein said fixed coder acting to indicate that the signals originate from a ground-located responder comprises a delay line having a known delay and a bypass path, signals being sent through said bypass path and through said delay line whereby they are doubled.

6. The apparatus of claim 5 wherein said decoder means comprises a delay line having the same delay as in the fixed coder and a coincidence gate, signals being fed to said coincidence gate directly and via said delay line whereby doubled signals of the correct spacing emerge from the coincidence gate as single signals.

7. Transponder ranging apparatus for terrain clearance comprising a ground-located responder and an aircraft-located interrogator, including: in the interrogator, means to generate a pulse pair at a spacing indicative of the height of the aircraft to form an interrogation signal, a transmitter and means passing said interrogation signal to said transmitter; in the responder, a receiver to receive the interrogation signal, height decoding means connected to said receiver to reject the interrogation signal if the height coding thereof corresponds to a height higher than the height of said responder, a fixed responder coding delay, a height variable delay set in accordance with the height of the responder, a transmitter and means passing a pulse from said height decoding means to said transmitter through and in parallel to said fixed responder coding delay and said height variable delay thereby to generate a three-pulse sequence as a response signal; and in the interrogator, a receiver for said response signals, a decoding device sensitive to the coding imparted by said fixed responder coding delay to accept the response signal, a decoding device sensitive to the height coding of the response signals to accept such response signal if the height coding corresponds to a height greater than the height of the aircraft, and a warning device activated by a response signal accepted by both said decoding devices.

8. The apparatus of claim 7, in which, in the responder, delay means are provided to impart to the interrogation signals a delay in dependence upon the direction from which they were received.

9. The apparatus of claim 7, in which, in the interrogator, delay means are provided to impart a delay to the response signals in dependence upon the direction from which they were received.

10. The apparatus of claim 9 in which is provided, in the interrogator, an air speed sensor having an output, and further delay means set by the output of said air-speed sensor, whereby a further delay is imparted to the response signals in the interrogator in dependence on the air speed of the interrogator.

11. The apparatus of claim 7 including, in the interrogator, means to indicate the direction from which a response signal is received.

12. The apparatus of claim 7 including, in the interrogator, means to determine the amount of the difference between the height coding of the responder and the height of the aircraft and to indicate the value of such difference.

13. Transponder ranging apparatus for terrain clearance purposes comprising an aircraft-located interrogator and a ground-located responder including: in said interrogator, a pulse source, a first height sensitive device, a first height delay controlled by said first height sensitive device, and a first transmitter, means passing a pulse from said pulse source to said first transmitter through and in parallel to said first height delay whereby a pulse pair is generated as an interrogation signal, such pulse pair being separated by a time controlled by the height sensitive device; in said responder, a first receiver, a second height sensitive device, a second height delay controlled by said second height sensitive device, means passing a response signal from said first receiver to said second height delay, a first height gate, means passing the delayed signal from said second height delay to said first height gate, means passing a response signal from said second receiver to said first height gate whereby a single response pulse is generated, a series-connected first fixed delay, third height delay and second transmitter, such third height delay being controlled by said second height sensitive device, means passing said single response pulse to said second transmitter directly, via said first fixed delay and via said first fixed delay and third height delay in series, thereby to form a three-pulse response signal;

in said interrogator, a second receiver, a second fixed delay having a delay equivalent to said first fixed delay, a beacon coincidence gate, means feeding a response signal from said second receiver to said beacon coincidence gate directly and via said second fixed delay, a fourth height delay fed by the output from said beacon coincidence gate, said fourth height delay being controlled by said first height sensitive device, means connected to the output of said fourth height delay to generate a long pulse characteristic of the range of heights to be received, a second height coincidence gate fed by said long pulse and also by the output of said second receiver whereby an output pulse from said second height coincidence gate corresponds to a dangerous situation.

No references cited.